Patented July 10, 1934

1,966,080

UNITED STATES PATENT OFFICE 1,966,080

CEMENT PAINT

Joseph C. Pearson, Allentown, Pa., assignor to Lehigh Portland Cement Company, Allentown, Pa., a corporation of Pennsylvania No Drawing. Application December 15, 1932, Serial No. 647,411

14 Claims. (Cl. 134—46)

This invention relates to a coating composition and more particularly to an improved paint containing finely divided cement particles in suspension and adapted to be applied to metal, cement, concrete, stucco, masonry, stone and other surfaces.

Attempts have previously been made to prepare cement paints or washes to be applied to concrete work, stucco, masonry, etc. These paints or washes consisted essentially of thin mixtures of Portland cement and water and were unsatisfactory in that they had poor covering power, were of grainy or muddy texture and would cure so slowly that they would dust off before they became hard. Also, they were objectionable because of their tendency to check and scale after application.

The present invention is concerned with the preparation of an improved cement paint of high durability, plasticity and spreading quality. Another object is to provide such a paint which becomes hard and dustless only a few hours after application. A further object is to provide such a paint which has a large covering capacity and hiding power and which gives a smooth finish which is not subject to scaling and crazing. It is also an object to provide an improved process for producing such a paint. Other objects will become apparent.

In the preparation of my new paint, Portland cement, and preferably only the finer particles of the cement, is treated with a solution of calcium chloride sufficiently concentrated to cause the cement to gel. When the gel which is formed thickens to the desired degree, water is added in small quantities and with stirring until a highly plastic paint, made up of the gelled cement particles and having properties very similar to those of ordinary oil paint, is produced. This mixture does not settle appreciably and can be used for two hours or more with only an occasional addition of a little water.

As a specific example of my procedure, ordinary Portland cement may be subjected to an air-separation to remove the coarse, gritty particles and preferably to leave a cement "flour" of which about 98 to 100% will pass through a No. 325 mesh sieve and not less than about 90 to 95% of the particles are finer than 30 microns. This finely divided cement flour is then treated with a solution of calcium chloride in water, of which the concentration may vary from about 8% to more than 20% by weight, calculated as $CaCl_2$. This treatment may be applied in various ways, but the preferred method is as follows:

In a suitable mixing vessel is placed a quantity of water which is about 50 to 60% of the weight of the cement to be used. The cement is then added, and with vigorous stirring, the mixture is brought to a smooth paste, free from lumps. Then a strong calcium chloride solution (preferably saturated, or nearly so) is added in sufficient amount to produce the desired concentration of the salt. This is quickly stirred into the paste until a uniform, thin consistency is obtained, and the mixture is then allowed to stand. Within a few minutes the cement will start to gel and the mixture to thicken. After the mixture has become fairly stiff (for example, such that it flows very sluggishly upon tilting the vessel) it is then stirred vigorously to a smooth, highly plastic paste, water being added in small increments as the stirring is continued until the desired brushing or spraying consistency is reached.

The concentration of the calcium chloride in the solution with which the cement contacts during the gelling step may be varied, for instance, from about 8–25%, preferably between 12 and 20%, and depends to some extent upon the curing conditions to which the paint is to be subjected in use, but in any case should be sufficient to cause gelling in order to develop the desirable properties of the paint to the fullest extent. Where the paint is to be applied under average drying conditions without curing, for example, when applied to a metal or other surface incapable of holding water, a higher concentration is desirable and should be above 15%. Where the paint is to be applied to a wet surface or in a moist atmosphere, and where the paint will cure slowly, a smaller concentration of calcium chloride may be used.

The quantity of the calcium chloride solution used is preferably such as to give about 5–25% by weight of calcium chloride based upon the cement content of the paint.

The paint may be applied by a brush or sprayed, and it dries quickly without dusting. However, if the paint is to be applied to an absorptive surface, such surface should first be wetted to prevent loss of water from the paint by capillary attraction. In some cases it may even be desirable to first apply a sizing or sealing coat to fill the pores of the surface. A cement paint prepared as described above has a high covering capacity and hiding power due to the plasticity of the gelled product and to the finely divided nature of the cement flour resulting from the removal of the coarse cement grains. In a few hours after the coating is applied it will be hard and adhesive and will not scale off nor craze when applied in sufficient thickness to cover and hide the surface.

The chloride treatment may also be given by adding directly to the cement a calcium chloride solution made up to the desired concentration. In this case a quantity of solution may be used which is from 70 to 90% of the weight of the cement. The solution may be placed in a suitable mixing vessel and the cement added all at once and stirred vigorously to a smooth paste, or the cement may be added slowly with continuous stirring until the gelling stage is reached. In either case, the mixture after gelling is reduced to the desired consistency by the addition of small increments of water with vigorous stirring. I have found that a calcium chloride solution of about 1.12 to 1.15 specific gravity is suitable for general use, and that this concentration will ordinarily impart such hardness and tenacity to a paint coating that it will stand hard brushing with a stiff-fibered scrubbing brush 24 hours or less after application.

The calcium chloride may also be mixed with the cement in a dry condition in the proper proportions and water may be subsequently added to the mixture which, upon stirring, will form the plastic gel-like paste and upon the addition of further water and more agitation will produce the desired paint. With such a procedure, however, the quantity of water initially added to the cement should be such as to give a concentration of calcium chloride that will cause gelling, the remaining water being added after the gelling has proceeded to the desired extent.

Other calcium halides and oxyhalides may also be used, for example, calcium iodide, calcium bromide, calcium oxychloride, and it is not intended to limit the invention to the particular examples given, although I prefer to use calcium chloride. Other substances such as lime, borax, stearic acid, etc., may be added to the paint in small amounts to impart certain properties thereto which may be desirable under special conditions of use. Also, pigments or other coloring material may be added to give the desired color to the paint. Reference has been made to Portland cement although it is not intended thereby to exclude other types of cement.

The terms used in describing this invention have been used in their descriptive sense and not as terms of limitation and it is intended that all equivalents thereof may be considered within the scope of the appended claims.

What I claim is:

1. A process for preparing cement paint comprising treating particles of a cement having a Portland cement base with a solution of calcium chloride in sufficient concentration to cause substantial gelling of the cement, and containing about 8 to 25% calcium chloride by weight, the quantity of said solution being such as to give about 5 to 25% of calcium chloride based upon the weight of cement, and agitating it with additional water after substantial gelling has taken place.

2. A process for preparing cement paint comprising separating the coarse, gritty particles from a cement having a Portland cement base to produce a cement flour, treating the flour with a solution of calcium chloride in sufficient concentration to cause gelling of the cement and containing about 8 to 25% calcium chloride by weight, the quantity of said solution being such as to give about 5 to 25% of calcium chloride based upon the weight of cement, agitating the mixture until the gelling has proceeded to such an extent that the mixture flows sluggishly upon tilting the vessel, and thereafter adding water and agitating to produce a plastic paint.

3. A process as defined in claim 1 in which the calcium chloride solution is of a concentration of about 12–20%.

4. A process as defined in claim 1 in which the cement is first mixed with water to produce a smooth paste and a concentrated calcium chloride solution is added to the paste while agitating it.

5. A process for preparing cement paint comprising agitating finely divided particles of a cement having a Portland cement base with water to produce a smooth paste, quickly mixing a solution of calcium chloride with the cement in sufficient quantity and concentration to give a treating solution containing about 8 to 25% calcium chloride by weight and about 5 to 25% calcium chloride based upon the weight of cement, allowing the mass to stand until a plastic mass is formed and agitating it with additional water to form a smooth paint.

6. A process for producing cement paint comprising separating the coarse, gritty particles from a cement of Portland cement base to leave a cement flour, about 98 to 100% of which will pass through a No. 325 mesh seive and not less than 90 to 95% of which is finer than 30 microns, treating this cement flour with a solution containing about 10–25% of calcium chloride by weight in such a proportion as is required to give about 10 to 25% calcium chloride based upon the cement content, stirring the mixture and after substantial gelling has taken place, adding water and stirring until a plastic paint of the desired consistency is produced.

7. A process for producing cement paint comprising treating finely divided cement of Portland cement base with a solution of calcium chloride containing about 10 to 25% by weight of calcium chloride in the proportions required to give about 10 to 25% calcium chloride, based upon the weight of cement, agitating and after substantial gelling has taken place, adding water and agitating until a plastic paint of the desired consistency is produced.

8. A process for preparing cement paint comprising treating finely divided particles of cement having a Portland cement base with a solution of a salt of the class comprising calcium halides or oxyhalides in sufficient concentration to cause gelling of the cement and containing about 8 to 25% of the calcium halide or oxyhalide, the quantity of said solution being such as to give about 5 to 25% of the calcium halide or oxyhalide based upon the weight of cement, and agitating the mass with additional water after substantial gelling has taken place.

9. A cement paint comprising a gelled cement product resulting from the reaction upon cement having a Portland cement base of a solution of calcium chloride in a concentration of about 8 to 25%, the quantity of said solution being such as to give about 5 to 25% of calcium chloride based upon the weight of cement, in suspension in water.

10. A cement paint comprising about 50 to 65% cement in a gelled state, resulting from the reaction upon cement having a Portland cement base of a solution of calcium chloride in a concentration of about 8 to 25% of calcium chloride, the quantity of said solution being such as to give about 5 to 25% of calcium chloride based upon the weight of cement, in suspension in water.

11. A cement paint adapted to dry to a hard film without dusting in less than twenty-four hours consisting substantially of a suspension in water of a gelled cement product resulting from the reaction upon cement having a Portland cement base of a solution of calcium chloride of a concentration of about 8 to 25%, the quantity of said solution being such as to give about 5 to 25% of calcium chloride based upon the weight of cement.

12. A non-scaling cement paint adapted to dry to a hard, non-dusting, non-scaling film, comprising a suspension in water of a gelled cement product resulting from the reaction upon cement having a Portland cement base of a solution of calcium chloride of a concentration of about 8 to 25%, the quantity of said solution being such as to give about 5 to 25% of calcium chloride based upon the weight of cement.

13. A hard paint film highly resistant to dusting and scaling and consisting substantially of a gelled cement product resulting from the reaction upon cement having a Portland cement base of a solution of calcium chloride of a concentration of about 8 to 25%, the quantity of said solution being such as to give about 5 to 25% of calcium chloride based upon the weight of cement.

14. A process for preparing a cement paint, comprising treating particles of cement having a Portland cement base with calcium chloride in a solution containing about 12 to 20% calcium chloride by weight, said solution being equal to about 70 to 90% of the weight of the cement, and agitating the mixture with additional water to produce a plastic paint after substantial gelling has taken palce.

JOSEPH C. PEARSON.